United States Patent
Erimli et al.

(10) Patent No.: US 6,947,437 B1
(45) Date of Patent: Sep. 20, 2005

(54) PROGRAMMABLE OUTPUT QUEUES IN A NETWORK DEVICE

(75) Inventors: Bahadir Erimli, Campbell, CA (US); Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 848 days.

(21) Appl. No.: 09/846,287

(22) Filed: May 2, 2001

(51) Int. Cl.[7] .............................................. H04L 12/54
(52) U.S. Cl. ..................................... 370/418; 370/429
(58) Field of Search ............................. 370/229, 230, 370/231, 235, 236, 389, 412, 417, 418, 428, 370/429; 709/232, 235, 238, 240; 710/29, 710/36, 52, 53, 56

(56) References Cited

U.S. PATENT DOCUMENTS

| | | | |
|---|---|---|---|
| 5,841,722 A | 11/1998 | Willenz | 365/221 |
| 6,345,371 B1 * | 2/2002 | Lam | 714/719 |
| 6,405,258 B1 * | 6/2002 | Erimli et al. | 709/235 |
| 6,460,088 B1 * | 10/2002 | Merchant | 709/236 |
| 6,574,231 B1 * | 6/2003 | Leung | 370/412 |
| 6,577,636 B1 * | 6/2003 | Sang et al. | 370/395.7 |
| 6,636,523 B1 * | 10/2003 | Lau et al. | 370/415 |
| 6,728,213 B1 * | 4/2004 | Tzeng et al. | 370/235 |

* cited by examiner

Primary Examiner—Alpus H. Hsu
(74) Attorney, Agent, or Firm—Harrity & Snyder, LLP

(57) ABSTRACT

A network device that controls the communication of data frames between stations includes a number of receive ports that receive data frames from the stations and a number of output ports that transmit the data frames to their intended destinations. The network device also includes a number of output queues that store data forwarding information associated with the received data frames. The network device partitions each of the output queues into a number of portions corresponding to the priorities supported by the network device. The number of portions and the size of each portion of the output queues may be programmable by the user.

19 Claims, 8 Drawing Sheets

| | |
|---|---|
| 0 | d0 |
| 1 | d1 |
| 2 | d2 |
| 3 | d3 |
| 4 | d4 |
| 5 | d5 |
| 6 | d6 |
| 7 | d7 |
| 8 | d8 |
| 9 | d9 |
| 10 | d10 |
| 11 | d11 |
| 12 | d12 |
| 13 | d13 |
| 14 | d14 |
| 15 | d15 |

| PRIORITY CLASS | PORT VECTOR | UNTAGGED SET | RX PORT | VLAN ID | OPCODE | FRAME POINTER |

PROGRAMMABLE OUTPUT QUEUES IN A NETWORK DEVICE

TECHNICAL FIELD

The present invention relates generally to network communications and, more particularly, to partitioning an output queue in a network device.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of data and includes logic for receiving and forwarding data frames to their appropriate destinations.

In conventional network switches, the switch may process data frames based on a priority associated with a received data frame. For example, a network switch may categorize data frames as having either a high or low priority and may then process the data frames in accordance with the priority. As the number of priorities supported by the switch increases, reserving resources for processing data frames having each of a number of priorities becomes inefficient.

DISCLOSURE OF THE INVENTION

There exists a need for a mechanism for partitioning a resource associated with processing data frames in a network device based on the number of priorities supported by the network device. This and other needs are met by the present invention, where a multiport device includes output queues corresponding to the output ports on the multiport device. The output queues may be programmed to reserve space for data forwarding information associated with data frames for each of the priorities supported by the multiport device.

According to one aspect of the present invention, a network device that controls communication of data frames between stations is provided. The network device includes a plurality of input ports configured to receive data frames from the stations and a plurality of output ports configured to transmit the data frames to their intended destinations. The network device also includes data frame processing logic configured to identify data forwarding information for the received data frames, the data forwarding information identifying at least a first one of the output ports. The network device further includes a plurality of output queues corresponding to the plurality of output ports, each of the plurality of output queues being configured to store data forwarding information associated with the received data frames. Each of the plurality of output queues also includes a configurable number of portions corresponding to priorities associated with the received data frames.

Another aspect of the present invention provides a method in a network device that controls communication of data frames between stations. The method includes receiving a data frame on a first one of a plurality of input ports and identifying data forwarding information for the data frame, the data forwarding information identifying at least a first output port. The method also includes generating a forwarding descriptor for the data frame, the forwarding descriptor including a frame pointer that identifies a location in external memory where the data frame is stored and a priority associated with the data frame. The method further includes storing at least a part of the forwarding descriptor in a portion of a first one of a plurality of output queues based on the priority associated with the data frame, where each of the plurality of output queues has a configurable number of portions.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
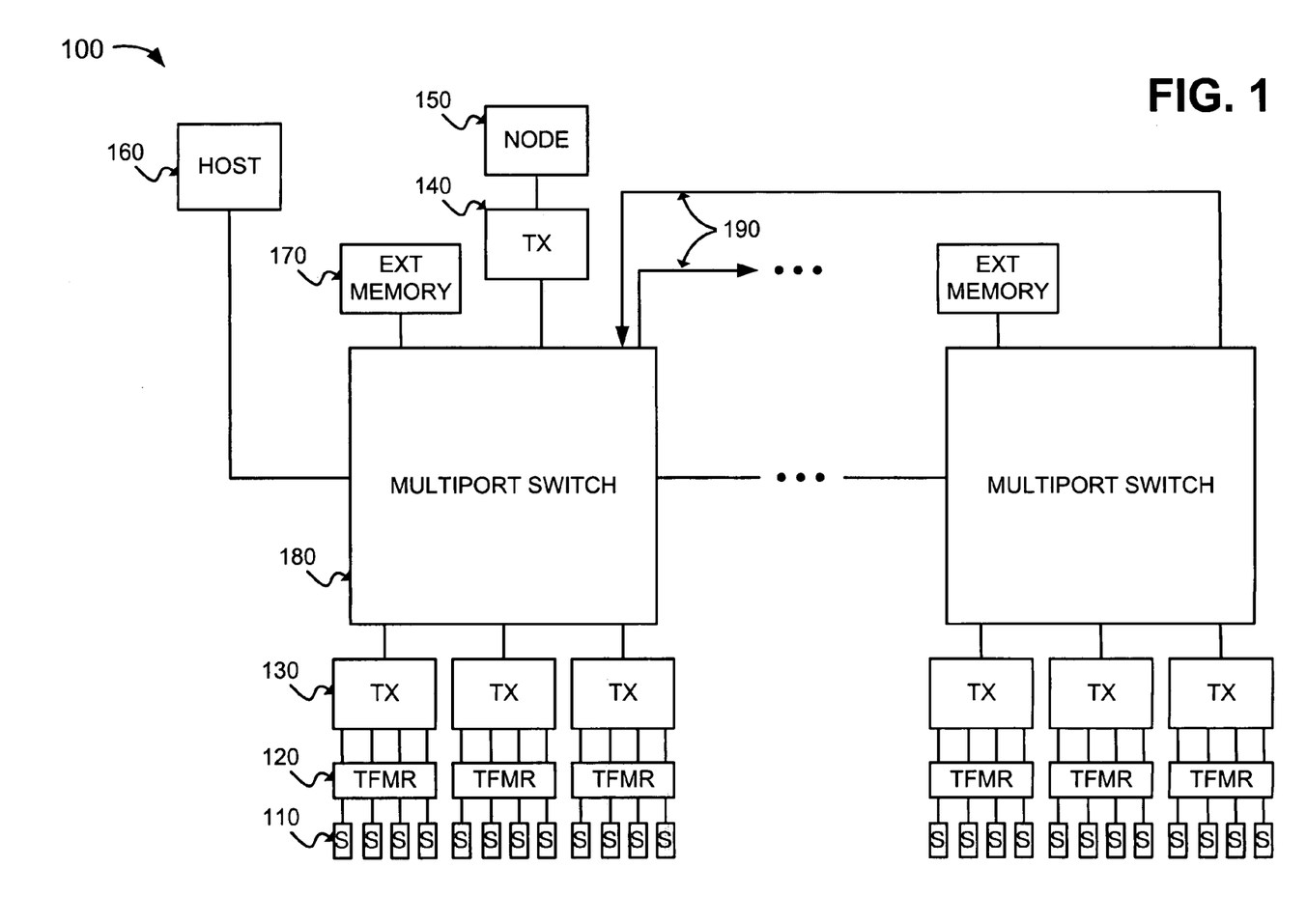
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
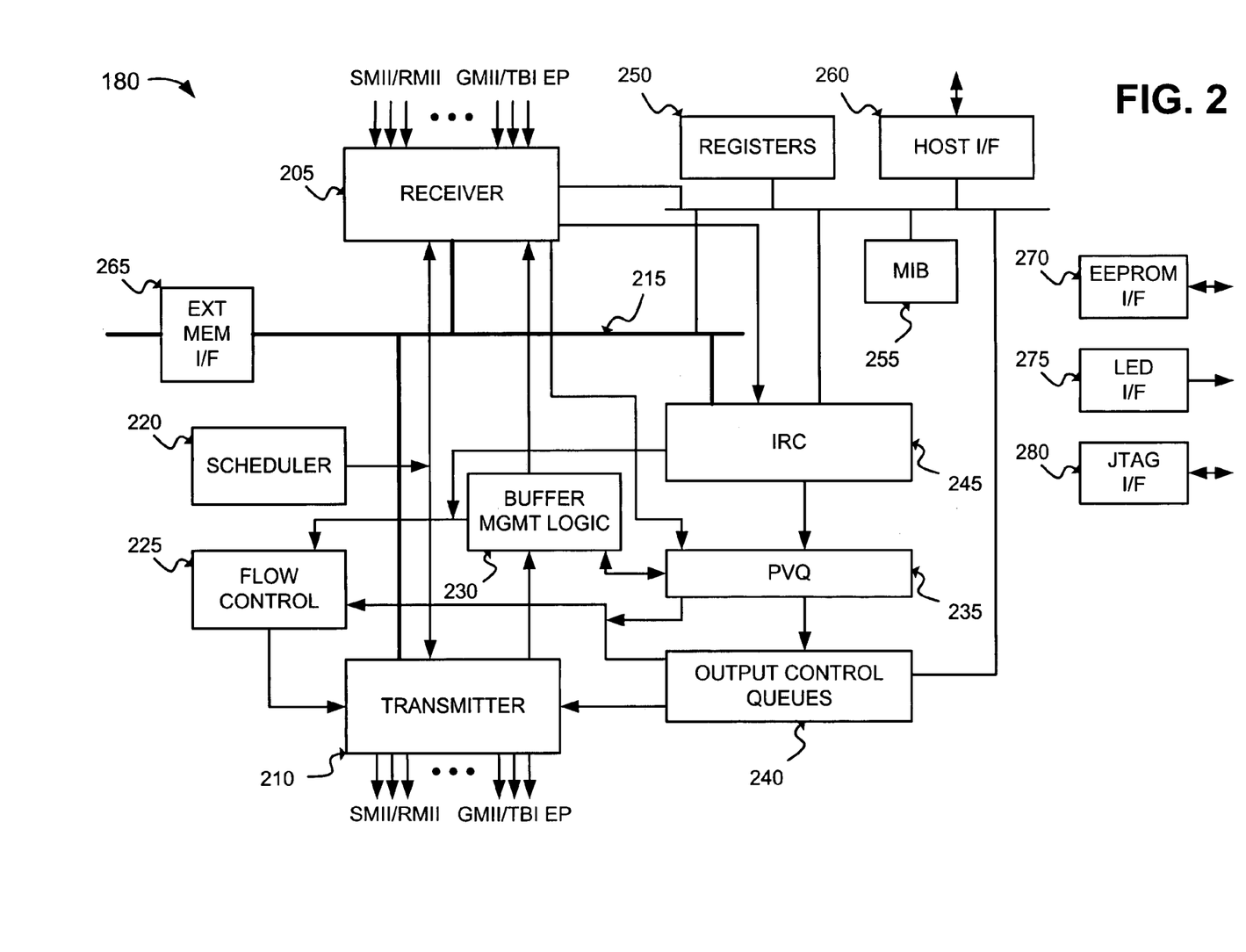
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 1110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Output Queue Partitioning

The present invention is directed to partitioning the output control queues 240 to support processing associated with data frames having a number of priorities. The output control queues 240, consistent with the present invention, may include a queue for each of the transmit modules in transmitter 210. The multiport switch 180 may program the amount of space available in each of the queues for each of the priorities supported by the multiport switch 180, thereby enabling one output control queue to support all the priority classes.

Figure 3:
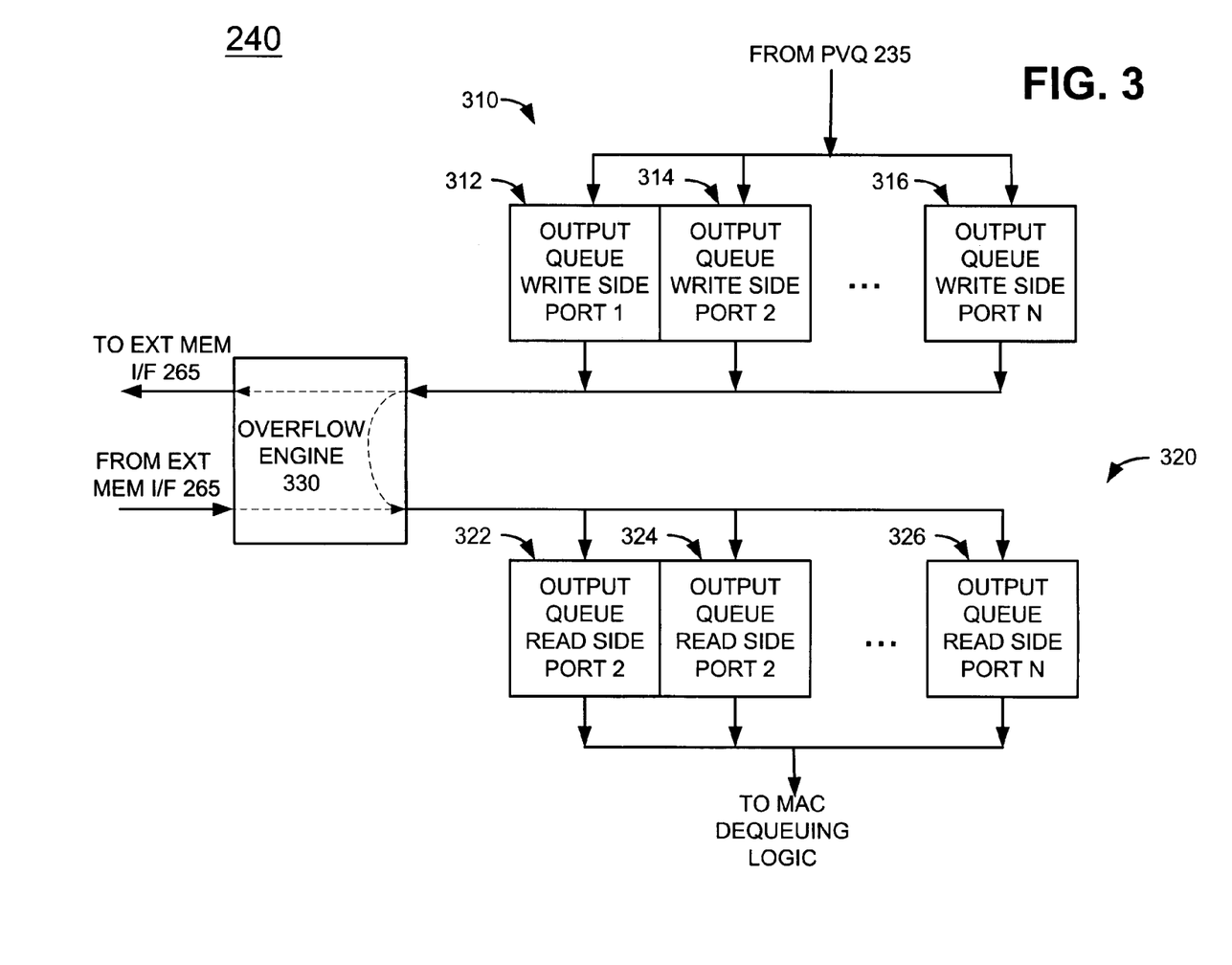
FIG. 3 is an exemplary detailed block diagram of the output control queues of FIG. 2, consistent with an implementation of the present invention.

FIG. 3 illustrates the output control queues 240 consistent with an exemplary implementation of the present invention. Referring to FIG. 3, output control queues 240 include a write side 310, a read side 320 and an overflow engine 330.

Both the write side 310 and the read side 320 include individual queues corresponding to each output port on the multiport switch 180.

For example, write side 310 includes output queues 312, 314 and 316 corresponding to output ports 1 through N, respectively. Read side 320 similarly includes output queues 322, 324 and 326 corresponding to output ports 1 through N, respectively. PVQ 235 writes data forwarding information to the output queues on the write side 310. The output queues on the write side 310 may pass the data forwarding information directly to the corresponding queue on read side 320, if the particular write side queue is empty. When the read side 310 for a particular one of the output queues is full, overflow engine 330 may transfer additional entries from the write side 310 to the particular output queue's overflow area in external memory 170 (FIG. 1), via external memory interface 265.

Figure 4:
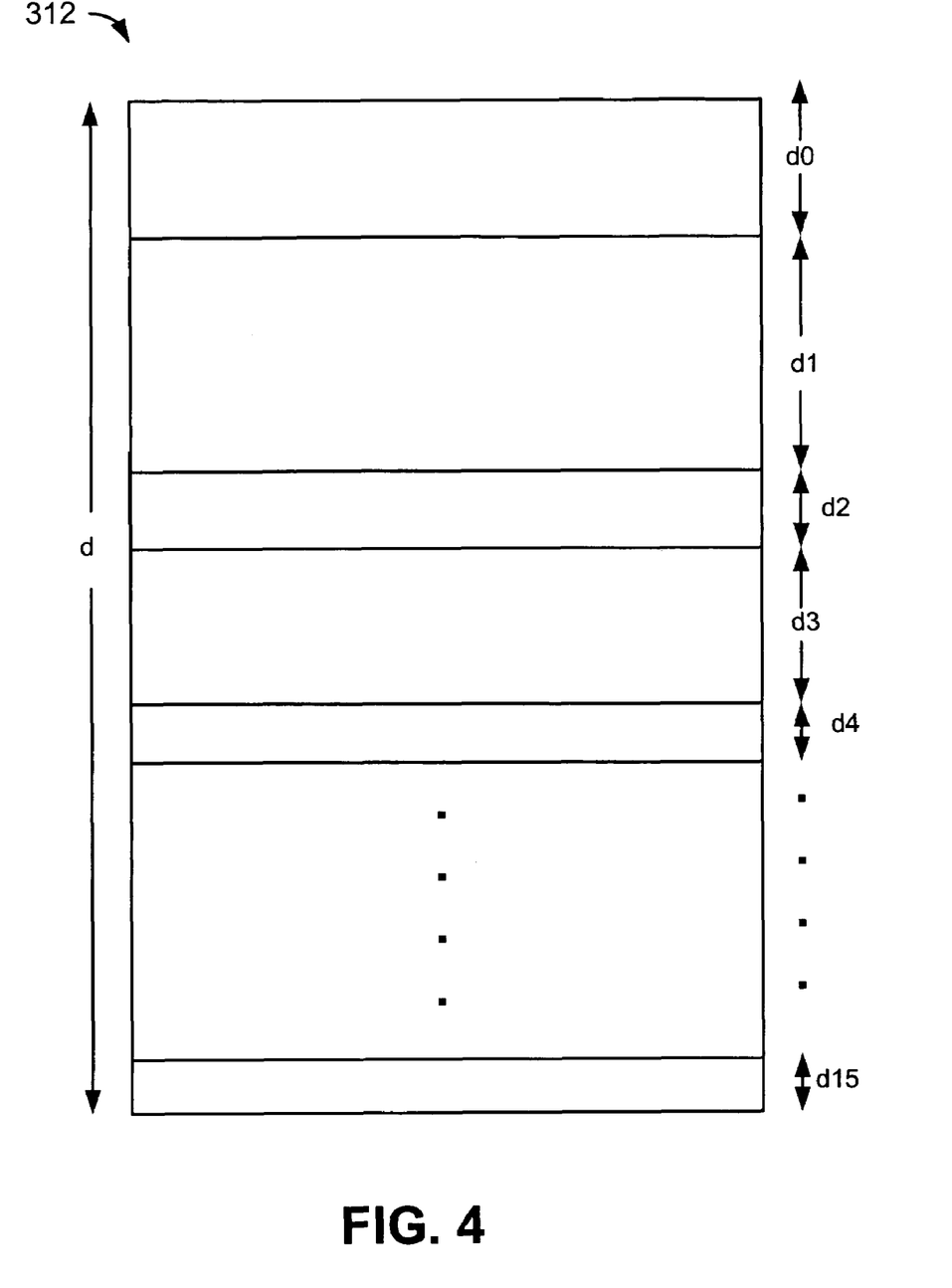
FIG. 4 is an exemplary diagram of an output queue in the output control queues of FIG. 3, consistent with the present invention.

Each individual output queue on the write side 310 may be subdivided into portions corresponding to the number of priorities supported by the multiport switch 180. For example, FIG. 4 illustrates output queue 312 according to an exemplary implementation consistent with the present invention. The other output queues on the write side 310 may be similarly configured. Referring to FIG. 4, output queue 312 may include a random access memory (RAM) that has a depth "d," where d corresponds to the total number of entries that may be stored in the output queue 312. Each entry in output queue 312 may include frame pointer information and other information associated with forwarding the data frame, as described in more detail below. The frame pointers, as described previously, identify the locations in external memory 170 where the data frames are stored while the multiport switch 180 is processing the data frames to generate data forwarding information.

According to an exemplary implementation of the present invention, the depth of output queue 312 may be 512 (i.e., d=512). In this case, a total of 512 entries may be stored in output queue 312. It should also be understood that the depth of output queue 312 may be any other value based on the particular user requirements and the space available on the multiport switch 180. In any event, the output queue 312 may be partitioned into 16 portions, corresponding to 16 unique priority levels that may be supported by multiport switch 180, consistent with an exemplary implementation of the present invention. The depth of each of the individual portions in the output queue 312 may be programmed based on the user's requirements.

Figure 5:
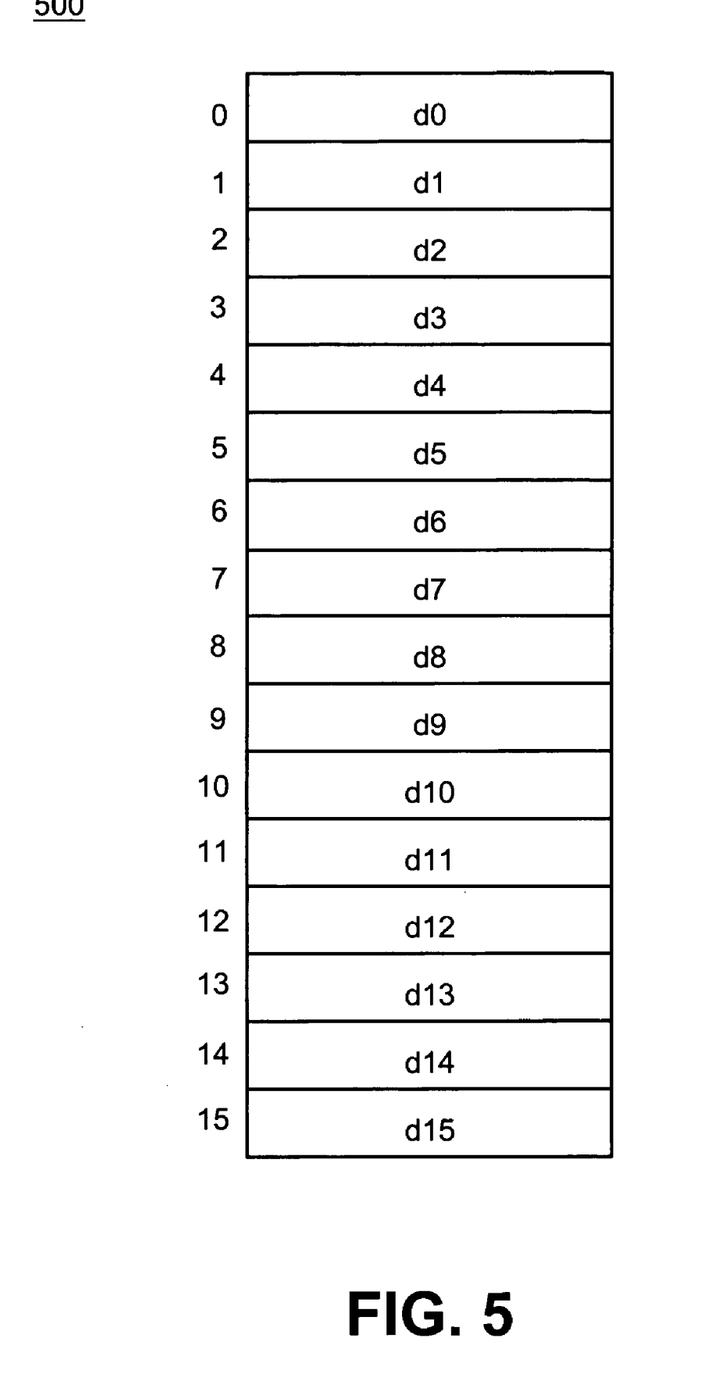
FIG. 5 is an exemplary diagram of an output queue control register, consistent with an implementation of the present invention.

For example, the host 160, also referred to as host CPU 160, may program the various depths in the output queue 312 by writing values to an output queue control register. FIG. 5 illustrates an output control queue register 500 consistent with an exemplary implementation of the present invention. The output control queue register 500 may be included in registers 250 (FIG. 2) or elsewhere on the multiport switch 180.

Referring to FIG. 5, output queue control register 500 includes 16 addressable locations, labeled 0–15. These locations correspond to 16 unique priority levels that may be supported by the multiport switch 180. The host CPU 160, via host interface 260, sets the values in output queue control register 500 based on the particular user's requirements. For example, if the host CPU 160 wishes to reserve space in output queue 312 for 32 entries corresponding to priority 0 frames, the host CPU 160 writes the value 32 to location 0 in register 500 (i.e., d0=32). Similarly, if the host CPU 160 wishes to reserve space in output queue 312 for 64 entries corresponding to priority 1 frames, the host CPU 160 writes the value 64 to location 1 in register 500 (i.e., d1=64). In the event that the host CPU 160 does not wish to reserve space in output queue 312 for data frames of a particular priority, the host CPU 160 writes the value 0 to the appropriate location in register 500.

Setting one or more depths to zero may be useful in situations where the multiport switch 180 does not support 16 priority levels. For example, if the multiport switch 180 supports 8 priority levels, the host CPU 160 may write the value 0 to locations 8–15 (i.e., d8–d15= 0) in output queue control register 500. Similarly, if the multiport switch 180 supports only high and low priority data frames, host CPU 160 may write the value 0 to locations 2–15 (i.e., d2–d15=0) in output queue control register 500. This increases the flexibility associated with setting the depths and enables multiport switch 180 to be used in situations where the number of priority levels supported varies. This also enables the multiport switch 180 to more efficiently utilize the space available in the output queues, such as output queue 312.

In the manner described above, the host CPU 160 may set the amount of space available in the output queues for entries associated with each priority level to any particular value. The write side output queues 312–316, consistent with the present invention, may all be configured based on the settings in register 500. That is, the settings in register 500 may determine how much space is available in each of the output queues 312–316 for each of the priorities. In alternative implementations of the present invention, a number of registers 500 may exist corresponding to each of the particular output queues. That is, a separate register 500 may be included for each of output queues 312–316. In this situation, the host CPU 160 may program each of the registers 500 based on the particular user's requirements.

The read side output queues 320 may also include locations reserved for each priority class. For example, the output queue 322 may be divided into portions corresponding to the number of priorities supported by the multiport switch 180 in a similar manner as output queue 312. The output queue 322, however, may include space for fewer entries than the corresponding write side queue 312.

In one implementation consistent with the present invention, each of the read side queues 322–326 may include space for entries of each priority based on the amount of space available for the particular priorities in the write side output queues 312–316. For example, if the write side output queue 312 includes space for 64 entries of a particular priority, the corresponding read side output queue 322 may include space for sixteen entries (i.e., one fourth the space available in the write side output queue 312) associated with that particular priority.

Alternatively, the read side output queues 322–326 may include other amounts of space for entries associated with each of the priorities. For example, the read side output queues 322–326 may include the same amount of space for entries of each of the priorities as the write side queues 312–316. In this case, each of the read side output queues 322–326 may be configured in the same manner as write side output queues 312–316 based on the settings in output queue control register 500 (FIG. 4).

Figure 6:
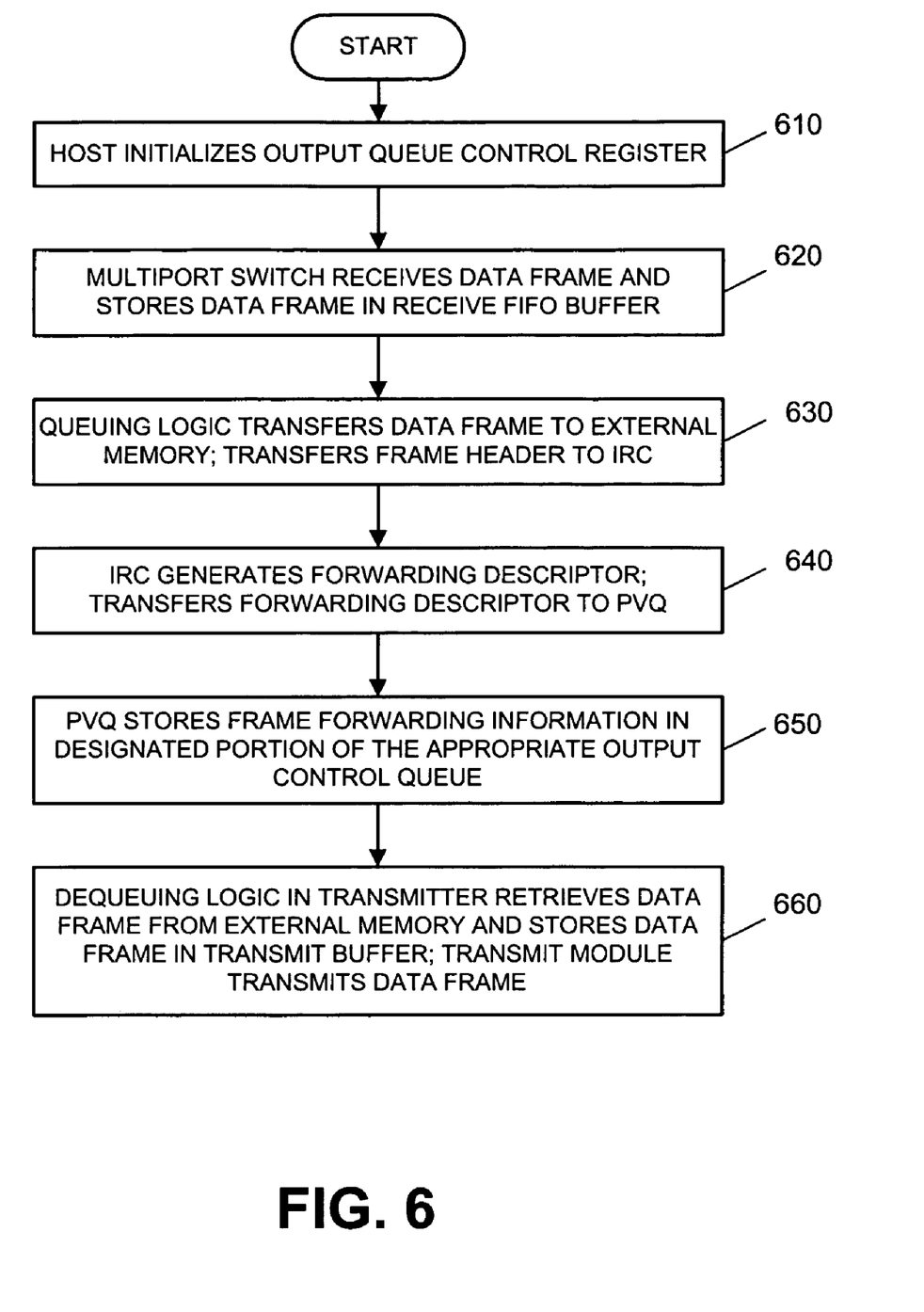
FIG. 6 is a flow diagram illustrating exemplary processing by the multiport switch of FIG. 2, consistent with an implementation of the present invention.

FIG. 6 illustrates exemplary processing by multiport switch 180 in an implementation consistent with the present invention. Processing may begin upon start-up of multiport switch 180 and host CPU 160. Upon start-up, the host CPU 160 initializes various registers and tables on multiport switch 180, such as the output queue control register 500 [step 610]. That is, the host CPU 160 may set the depths d0–d15 in output queue control register 500 via host interface 260, based on the particular user's requirements.

After the various registers and tables are initialized, assume that a network station 110 transmits a data frame and multiport switch 180 receives the data frame [step 620]. The multiport switch stores the received data frame in a receive FIFO buffer in receiver 205 [step 620]. Queuing logic located in receiver 205 may obtain a frame pointer from a buffer located in buffer management logic 230. The queuing logic may then transfer the data frame to external memory 170, via external memory interface 265, at the location identified by the frame pointer [step 630]. The queuing logic may also transfer the frame header to IRC 245 [step 630].

Figure 7:
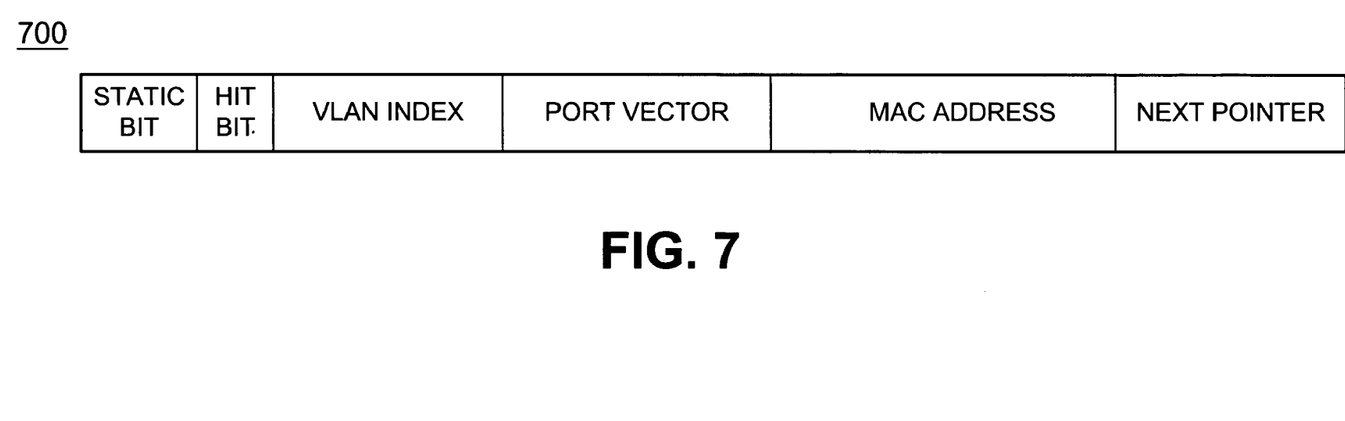
FIG. 7 is a diagram illustrating an exemplary format of an entry in an IRC address table, according to an implementation consistent with the present invention.

The IRC 245 may then perform a hash search of an IRC address table to identify data forwarding information. FIG. 7 illustrates an exemplary format of an entry in the IRC address table. Referring to FIG. 7, the address table entry 700 includes a static bit, a hit bit, a virtual local area network (VLAN) index field, a port vector field, a MAC address field and a next pointer field. The static and hit bits are used by an aging state machine during an aging process. The VLAN index field may be used to reference a VLAN identifier (ID). A VLAN index-to-ID table may contain the mapping associations between the VLAN index and the VLAN ID. The port vector field identifies the port(s) to which a frame should be forwarded. The MAC address field is used for matching the address information included with the received data frames to an entry in the IRC address table. The next pointer field identifies another entry in the IRC address table associated with searching the IRC address table. The fields illustrated in FIG. 7 are exemplary only. It should be understood that additional fields or other fields may be included in an IRC address table entry 700 in other implementations consistent with the present invention.

The IRC 245 may perform a hash search of the IRC address table to identify an entry whose address and VLAN index match the source address and VLAN index associated with the data frame. The IRC 245 may then perform a second hash search of the IRC address table to find an entry whose address and VLAN index match the destination address and VLAN index associated with the data frame.

Figure 8:
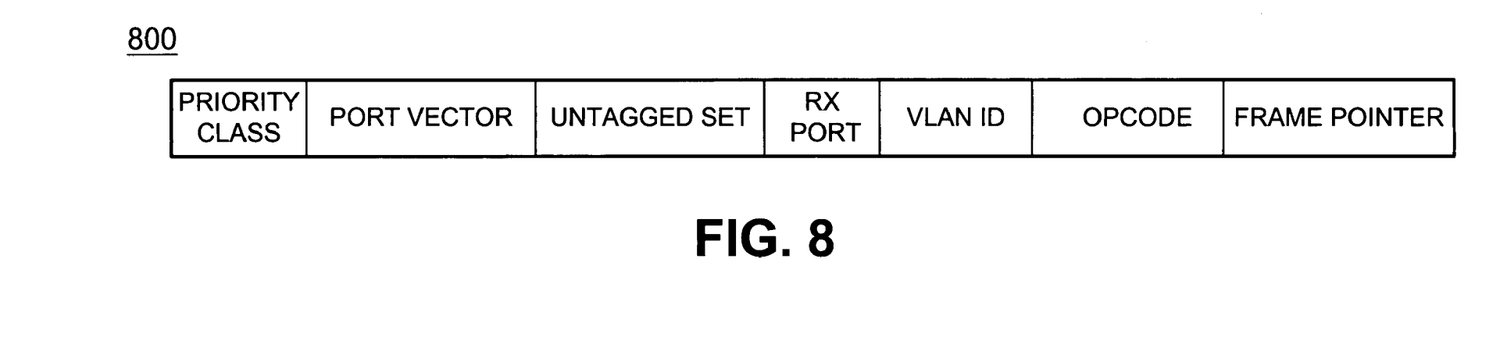
FIG. 8 is a diagram illustrating an exemplary forwarding descriptor, according to an exemplary implementation of the present invention.

The IRC 245 may use the information identified in the matching entry associated with the destination address/VLAN index search to generate a forwarding descriptor for the data frame [step 640]. FIG. 8 illustrates an exemplary forwarding descriptor consistent with an implementation of the present invention.

Referring to FIG. 8, forwarding descriptor 800 includes a priority class field, a port vector field, an untagged set field, a receive (RX) port field, a VLAN ID field, an opcode field and a frame pointer field. The priority class field indicates the priority associated with the data frame and also indicates the location in the particular output queue in which the frame pointer and other data forwarding information may be placed.

In one exemplary implementation of the present invention, the multiport switch 180 categorizes data frames as having either a high priority or a low priority. A high priority frame may include a frame that requires lower access latency, such as a frame for a multimedia application. A low priority frame may include any other frame. In this case, the host CPU 160 may set d0 to d1 in output queue control register 500, corresponding to the high and low priority classes, to any particular value based on the user's requirements. The host CPU 160 may also set d2–d15 in output queue control register 500 to zero since only two priority classes are supported.

In alternative implementations, the number of priorities associated with the data frames may be greater than two. For example, the multiport switch 180 may identify frames having one of three levels of priority, such as low, medium and high. In this case, the host CPU 160 may set d0–d2 in output queue control register 500 to any particular value and may set d3–d15 to zero.

In addition, in further implementations of the present invention, the multiport switch 180 may receive data frames having a priority indication. For example, an Ethernet frame may include a three-bit field representing one of eight levels of priority. In this case, the host CPU 160 may set d0–d7 in output queue control register 500, corresponding to priorities 0–7, to any particular value, if the multiport switch 180 supports the eight priority classes. The host CPU 160 may also set d8–d15 in output queue control register 500 to zero. If the multiport switch 180 does not support the eight priority classes, priority mapping logic on multiport switch 180 may map the received priority information to a corresponding priority level supported by the multiport switch 180. For example, the eight levels of priority may be mapped to either high or low priority on the multiport switch 180. Alternatively, the eight levels of priority associated with received data frames may be mapped to three or more levels of priority on the multiport switch 180.

In any event, the output queue control register 500 supports up to 16 unique priority levels in an exemplary implementation of the present invention. The host CPU 160 may set the values in output queue control register 500 based on the particular number of priorities supported by the multiport switch 180 and the particular user's requirements.

Referring back to FIG. 8, the port vector field identifies each port(s) that should receive the data frame for transmission to its destination address. The untagged set field indicates which ports should remove VLAN tag headers before transmitting frames. The RX port field indicates the port on which the frame was received. The VLAN ID field is a 12-bit field that includes the VLAN identifier associated with the data frame. The opcode field contains information indicating how the data frame should be modified, if necessary, before transmission. The frame pointer field identifies the location in external memory 170 where the data frame is stored.

The IRC 245 generates the forwarding descriptor 800 and transfers the forwarding descriptor 800 to PVQ 235 [step 640]. The PVQ 235 receives the forwarding descriptor 800 and may pass a portion of the forwarding descriptor 800 to a particular location in the appropriate queue in output control queues 240 [step 650].

For example, assume that the port vector field of the forwarding descriptor 800 identifies port 1 as a destination for the data frame and the priority class field in the forwarding descriptor 800 corresponds to priority 1. In this case, the PVQ 235 may transfer the frame pointer, opcode and RX port information from the forwarding descriptor 800 to output queue 312, since output queue 312 corresponds to port 1. In addition, the PVQ 235 writes the frame pointer, opcode and RX port information to the portion of the output queue 312 associated with priority 1 data frames. In the example described previously in relation to FIG. 4, the portion of the output queue 312 designated as d1 corresponds to the area reserved for priority 1 data frame information. Therefore, in this example, the PVQ 235 writes the data frame information to the portion of the output queue 312 identified by d1.

The output control queues 240 transfer the data forwarding information on the write side 310 to the read side 320, via the overflow engine 330, if necessary. As described previously, the output queues on read side 320 may also include locations reserved for each priority class. For example, the output queue 322 may be divided into portions corresponding to the number of priorities supported by the multiport switch 180 in a similar manner as output queue 312. The output queue 322, however, may include space for fewer entries than the corresponding write side queue 312.

Dequeuing logic in the appropriate MAC transmit module in transmitter 210 may then process the data forwarding information on the read side 320 of the output control queues 240. In an exemplary implementation, the dequeuing logic may read the frame pointers included in the data forwarding information stored in the read side output queues 322–326 and retrieve the respective data frames from external memory 170 [step 660]. The dequeuing logic may process the data forwarding information in the output queues 322–326 based on the location of the data forwarding information, so that the higher priority data frames are processed before the lower priority data frames. For example, the dequeuing logic may read the information in the read side output queue 322 corresponding to the highest priority first, followed by the next highest priority, etc. In an exemplary implementation, the highest priority information may be stored at location d0 (FIG. 4). In this case, the dequeuing logic may read the data in location d0 first, followed by d1, d2, etc.

The dequeuing logic may then store the data frame and forwarding information in a transmit FIFO buffer in the appropriate MAC transmit module [step 660]. Since the higher priority data frames are processed first, these higher priority data frames may be transmitted before lower priority data frames. The dequeuing logic may also modify the data frames, if necessary, based on the opcode information included in the data forwarding information. In any event, the MAC transmit module may then transmit the data frames to their appropriate destinations via the transmit port identified in the forwarding descriptor [step 660].

Described has been an apparatus and method for partitioning a resource in a network device based on the number of priorities supported by the network device. One advantage of the present invention is that the multiport switch 180 includes output queues that support data frames of different priorities. This enables the multiport switch 180 to save valuable space on the multiport switch 180 as compared to reserving a separate memory device for each priority. Another advantage of the present invention is that the multiport switch 180 may be easily reconfigured to support more priority classes in situations where the user's requirements change. The multiport switch 180 may also be easily reconfigured to change the number of entries for each priority class supported. This provides the user maximum flexibility in allocating output queue space on the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described in relation to partitioning an output queue into as many as 16 portions. The present invention may also be used in situations where each of the plurality of output queues may be partitioned into a fewer or a greater number of portions.

What is claimed is:

1. A network device configured to control communication of data frames between stations, comprising:
   a plurality of input ports configured to receive data frames from the stations;
   a plurality of output ports configured to transmit the data frames to their intended destinations;
   data frame processing logic configured to identify data forwarding information for the received data frames, the data forwarding information identifying at least a first one of the output ports;
   a plurality of output queues corresponding to the plurality of output ports, each of the plurality of output queues being configured to store data forwarding information associated with the received data frames, wherein each of the plurality of output queues includes a configurable number of portions corresponding to priorities associated with the received data frames; and
   a register configured to store information indicating a number of entries that may be stored in each of the number of portions of each of the plurality of output queues.

2. The network device of claim 1, wherein the data frame processing logic is further configured to:
   determine a priority associated with each of the received data frames, and
   store data forwarding information for a first one of the received data frames in at least one of the plurality of output queues, the data forwarding information being stored in the portion of the at least one output queue corresponding to the priority associated with the first data frame.

3. The network device of claim 1, wherein the plurality of output queues comprises a first group of output queues, the network device further comprising:
   a second group of output queues corresponding to the first group, and
   wherein data forwarding information associated with a first data frame stored in a first one of the output queues in the first group is transferred to a first output queue in the second group corresponding to the first output queue in the first group, the data forwarding information being stored in a portion of the first output queue in the first and second groups based on a priority associated with the first data frame.

4. The network device of claim 3, further comprising:
   an overflow engine configured to transfer data forwarding information associated with the first data frame to an external memory, when the portion of the first output queue in the second group is full.

5. The network device of claim 1, wherein the number of entries is programmable.

6. The network device of claim 1, wherein the register includes a plurality of entries corresponding to priority levels and when the contents of an entry in the register are zero, the network device does not support a priority level associated with the entry.

7. The network device of claim 1, wherein each of the plurality of output queues comprises a random access memory and the configurable number of portions is sixteen.

8. In a network device that controls communication of data frames between stations, a method comprising:
   receiving a data frame on a first one of a plurality of input ports;
   identifying data forwarding information for the data frame, the data forwarding information identifying at least a first output port;

generating a forwarding descriptor for the data frame, the forwarding descriptor including a frame pointer that identifies a location in external memory where the data frame is stored and a priority associated with the data frame;

storing at least a part of the forwarding descriptor in a portion of a first one of a plurality of output queues based on the priority associated with the data frame, each of the plurality of output queues having a configurable number of portions; and programming a number of entries that may be stored in each of the configurable number of portions of each of the plurality of output queues in a register, the number of portions corresponding to priorities supported by the network device.

9. The method of claim 8, wherein the plurality of output queues corresponds to a plurality of output ports on the network device.

10. The method of claim 9, wherein the storing at least part of the forwarding descriptor includes:

storing the frame pointer in the portion of the first output queue corresponding to the priority associated with the data frame.

11. The method of claim 8, wherein the programming a number of entries includes:

programming the number of entries corresponding to a priority not supported by the network device to zero.

12. The method of claim 8, further comprising:

transferring the part of the forwarding descriptor from the first output queue to a transmit buffer;

retrieving a data frame identified by the frame pointer from external memory;

storing the data frame in the transmit buffer; and forwarding the data frame via the first output port.

13. A network device configured to control communication of data frames between stations, comprising:

a plurality of input ports configured to receive data frames from the stations;

a plurality of output ports configured to transmit the data frames to their intended destinations;

a plurality of output queues corresponding to the plurality of output ports, each of the plurality of output queues being configured to include a number of portions corresponding to priorities associated with the received data frames and to store information associated with the received data frames, wherein the number of portions is greater than two;

a register configured to store information indicating a number of entries that may be stored in each of the number of portions of each of the plurality of output queues; and processing logic configured to:

receive frame header information for a first data frame, identify data forwarding information for the first data frame, the data forwarding information identifying at least a first one of the output ports, generate a forwarding descriptor associated with the first data frame, the forwarding descriptor including a priority associated with the first data frame, and store at least a part of the forwarding descriptor in a first one of the output queues, the part of the forwarding descriptor being stored in the portion of the first output queue corresponding to the priority associated with the first data frame.

14. The network device of claim 13, further comprising:

a plurality of transmit modules corresponding to the plurality of output ports, each of the plurality of transmit modules being configured to:

transfer the part of the forwarding descriptor from the first output queue to a transmit buffer, retrieve a data frame associated with the forwarding descriptor from an external memory, store the data frame in the transmit buffer, and transmit the data frame via the first output port.

15. The network device of claim 13, wherein the plurality of output queues comprises a first group of output queues and a second group of output corresponding to the first group, the first output queue being included in the first group, and wherein the part of the forwarding descriptor associated with the first data frame stored in the first output queue in the first group is transferred to a first output queue in the second group, the part of the forwarding descriptor being stored in a portion of the first output queue in the second group based on a priority associated with the first data frame.

16. The network device of claim 13, wherein the number of entries is programmable.

17. The network device of claim 13, wherein the number of portions is programmable.

18. The network device of claim 13, wherein when the contents of an entry in the register are zero, the network device does not support a priority associated with the entry.

19. The network device of claim 13, wherein the number of portions is three.

* * * * *